United States Patent
Schroeder et al.

(10) Patent No.: US 9,036,379 B2
(45) Date of Patent: May 19, 2015

(54) POWER CONVERTER BASED ON H-BRIDGES

(75) Inventors: Stefan Schroeder, Munich (DE); Piniwan Thiwanka Bandara Wijekoon, Munich (DE)

(73) Assignee: General Electric Company, Niskayuna, NY (US)

( * ) Notice: Subject to any disclaimer, the term of this patent is extended or adjusted under 35 U.S.C. 154(b) by 12 days.

(21) Appl. No.: 13/296,349

(22) Filed: Nov. 15, 2011

(65) Prior Publication Data

US 2013/0121041 A1   May 16, 2013

(51) Int. Cl.
| | |
|---|---|
| *H02M 5/45* | (2006.01) |
| *B60L 15/00* | (2006.01) |
| *H02M 7/49* | (2007.01) |
| H02M 5/458 | (2006.01) |
| H02M 7/487 | (2007.01) |

(52) U.S. Cl.
CPC ............. *B60L 15/007* (2013.01); *H02M 7/49* (2013.01); *H02M 5/4585* (2013.01); *H02M 7/487* (2013.01)

(58) Field of Classification Search
CPC .................................................. H02M 5/458
USPC ........... 363/36, 37, 38, 43, 65, 66, 67, 71, 98, 363/148, 132, 127, 20, 35, 40, 41, 34, 45
See application file for complete search history.

(56) References Cited

U.S. PATENT DOCUMENTS

| | | | | |
|---|---|---|---|---|
| 2,224,645 | A * | 12/1940 | Eichberg ........................ | 363/35 |
| 5,625,545 | A | 4/1997 | Hammond | |
| 6,052,293 | A * | 4/2000 | Ivner et al. ..................... | 363/36 |
| 6,058,031 | A * | 5/2000 | Lyons et al. .................... | 363/67 |
| 6,297,616 | B1 * | 10/2001 | Kubo et al. .................... | 320/116 |
| 7,508,147 | B2 | 3/2009 | Rastogi et al. | |
| 7,679,313 | B2 | 3/2010 | Aiello et al. | |
| 7,830,681 | B2 | 11/2010 | Abolhassani et al. | |
| 2006/0221653 | A1 * | 10/2006 | Lai et al. ........................ | 363/37 |
| 2007/0073445 | A1 * | 3/2007 | Llorente Gonzalez et al. ............................ | 700/286 |
| 2007/0230226 | A1 * | 10/2007 | Lai et al. ........................ | 363/65 |
| 2010/0014325 | A1 | 1/2010 | Raju et al. | |
| 2010/0142234 | A1 | 6/2010 | Abolhassani et al. | |
| 2010/0254171 | A1 * | 10/2010 | Morishita et al. .............. | 363/71 |
| 2012/0033472 | A1 * | 2/2012 | Oka et al. ...................... | 363/127 |

FOREIGN PATENT DOCUMENTS

| | | |
|---|---|---|
| EP | 0913918 A2 | 6/1999 |
| EP | 1443634 A2 | 4/2004 |

OTHER PUBLICATIONS

Teodorescu et al., "Multilevel Inverter by Cascading Industrial VSI", IEEE Transactions on Industrial Electronics, vol. 49, Issue 4, pp. 832-838, Aug. 2002.

(Continued)

*Primary Examiner* — Matthew Nguyen
*Assistant Examiner* — Trinh Dang
(74) *Attorney, Agent, or Firm* — Andrew J. Caruso

(57) ABSTRACT

A power converter includes an active front end (AFE) that is coupled by a dc link stage to a plurality of H-bridge inverters. One or more multi-phase electro-magnetic energy conversion devices, such as transformers or electric machines, with open windings that are connected to only the AFE or only the H-bridge inverters or to both the AFE and H-bridge inverters, provide a regenerative or partial regenerative power converter.

21 Claims, 5 Drawing Sheets

(56) References Cited

OTHER PUBLICATIONS

Rodríguez et al., "Multilevel Inverters: A Survey of Topologies, Controls, and Applications", IEEE Transactions on Industrial Electronics, vol. 49, Issue 4, pp. 724-738, Aug. 2002.

Rodríguez et al., "Multilevel Voltage-Source-Converter Topologies for Industrial Medium-Voltage Drives", IEEE Transactions on Industrial Electronics, vol. 54, Issue 6, pp. 2930-2945, Dec. 2007.

Search Report and Written Opinion from corresponding PCT Application No. PCT/US2012/064030 dated Feb. 7, 2013.

* cited by examiner

US 9,036,379 B2

POWER CONVERTER BASED ON H-BRIDGES

BACKGROUND

The subject matter of this disclosure relates generally to power converters, and more particularly to power converter topologies based on H-bridges that are coupled to one or more multi-phase electromagnetic energy conversion devices (EMECDs), including without limitation, multi-phase transformers with open windings and/or electric machines with open windings, to provide a regenerative or partial regenerative power converter.

Power converter cell topologies associated with variable frequency drive (VFD) applications continue to receive attention. New power converter cell topologies are continually being introduced. Some known power converter cell topologies have employed H-bridge converters and/or H-bridge inverters.

Some of the foregoing power cells, when connected to a load, such as a motor, can provide power from an input source to a motor when operating in the motoring mode. Such a power cell may sometimes be referred to as a unidirectional or two-quadrant (2Q) cell. This is because when the four quadrants of speed and torque are considered, the operating characteristics of the cell are such that it operates in either the quadrant where both speed and torque are positive (first quadrant) or the quadrant where both speed and torque are negative (third quadrant).

When motor speed need to be reduced however, power from the motor needs to be absorbed by the power converter cell. This mode of operation is generally referred to as the regeneration mode. In such operating modes, regenerative or four-quadrant cells are required.

A regenerative converter may include a three level output power conversion stage. The output power stage generally includes electrical switches such as IGBTs (Insulated Gate Bipolar Transistors). Other useful switches include GTOs (Gate Turn Off Thyristors), IGCTs (Integrated Gate Commutated Thyristors), IEGTs (Injection Enhanced Gate Transistors) and MOSFETs (Metal Oxide Semiconductor Field Effect Transistors). The switches may be paired with antiparallel freewheeling diodes to accommodate, for example, inductive motor load currents. A controller is generally used for controlling each of the switches. The controller may comprise, for example, a computer and/or a digital signal processor.

Known regenerative power converter topologies comprising H-bridges continue to struggle with size, cost and reliability constraints due to the high number of active switches required to provide a workable topology. In view of the foregoing, there is a need to provide a regenerative power converter cell structure that requires fewer active switches to provide a workable topology having fewer components, higher reliability, less cost, and that has a smaller physical size than known regenerative power converter cell topologies.

BRIEF DESCRIPTION

An exemplary embodiment of a power converter comprises:
a first section comprising a plurality of H-bridge converters;
a second section comprising a plurality of H-bridge inverters, wherein each H-bridge inverter is coupled by a corresponding dc link stage to a corresponding H-bridge converter such that each dc link stage is isolated from every other dc link stage; and
a multi-phase electro-magnetic energy conversion device (EMECD) comprising open windings that are connected to the power converters to provide a regenerative power converter.

Another embodiment of a power converter comprises:
a first section comprising a plurality of H-bridge converters;
a second section comprising a plurality of H-bridge inverters, wherein each H-bridge inverter is coupled via a corresponding dc link stage to a corresponding H-bridge converter such that each dc-link stage is isolated from every other dc-link stage; and
a multi-phase electro-magnetic energy conversion device (EMECD) with open windings, wherein the open windings are connected to only the H-bridge inverters to provide a regenerative power converter.

According to yet another embodiment, a power converter comprises:
a first section comprising at least one three-phase input conversion stage;
a second section comprising a plurality of H-bridge inverters coupled to the first section by a single common dc link; and
a multi-phase electro-magnetic energy conversion device (EMECD) comprising open windings that are connected to only the H-bridge inverters to provide a regenerative power converter.

According to still another embodiment, a power converter comprises:
a first section comprising a plurality of H-bridge converters;
a second section comprising a plurality of H-bridge inverters, wherein first section is coupled by a single common dc link stage to the second section;
a first multi-phase electro-magnetic conversion device (EMECD) comprising open windings that are connected to only the H-bridge converters; and
a second multi-phase EMECD comprising open windings that are connected to only the H-bridge inverters to provide a regenerative power converter.

DRAWINGS

The foregoing and other features, aspects and advantages of the invention are apparent from the following detailed description taken in conjunction with the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
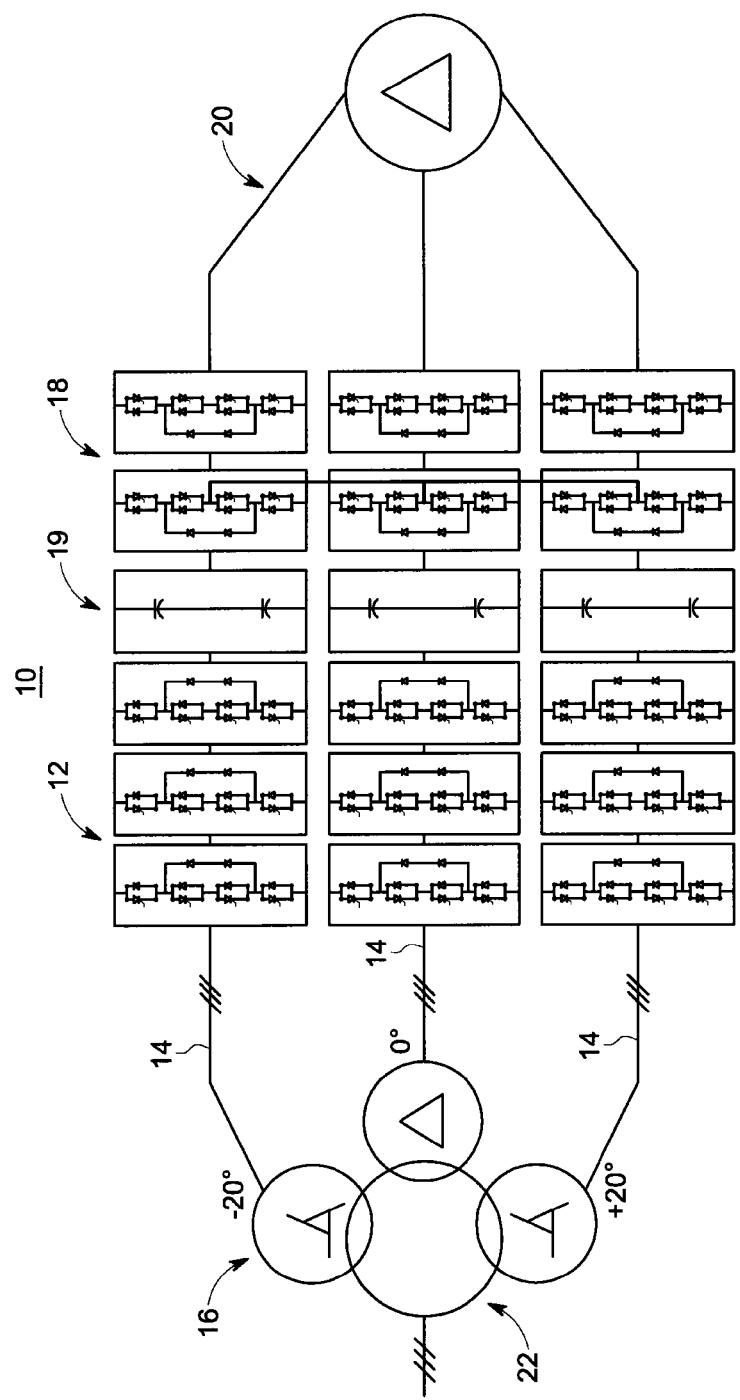
FIG. 1 is a simplified diagram illustrating a regenerative power converter cell topology that is known in the art.

FIG. 1 is a simplified diagram illustrating a regenerative converter topology 10 that is known in the art. It can be seen that the converter 10 employs a high parts count active front end (AFE) converter 12 per phase since it requires the use of 9 phase connections 14 and converter phase-legs in the converter 12 to connect with one or more conventional three-phase transformers 16. The drawing figures throughout have been simplified with small hashes crossing single line connections for ease of understanding. These small hashes are used to indicate the number of real connection wires which are represented by the single line diagrams.

The converter 10 can be seen to also employ a plurality of H-bridge inverters 18 that are each coupled to a corresponding AFE converter 12 via a corresponding dc-link 19. One output of each H-bridge inverter 18 of the three phases is generally connected to a corresponding output of each other H-bridge inverter 18. Each other H-bridge inverter output is then connected to its corresponding machine phase. Thus, each dc-link 19 must be isolated from every other dc-link 19 to avoid a short circuit condition.

Since the dc-links 19 are (indirectly) already connected via the output H-bridge inverters 18 on the output side 20, the same approach using H-bridges on the grid side 22 cannot be used. The present inventors recognized that a three-phase transformer with isolated secondary phase windings (open windings) could be employed along with H-bridge converters on the input (grid) side of a converter such as described herein with reference to FIG. 2, to isolate each dc-link from every other dc-link and avoid a short circuit condition. It can thus be appreciated that the three-phases can be connected together in only one or none of the converter sections 12, 18 or 19.

Figure 2:
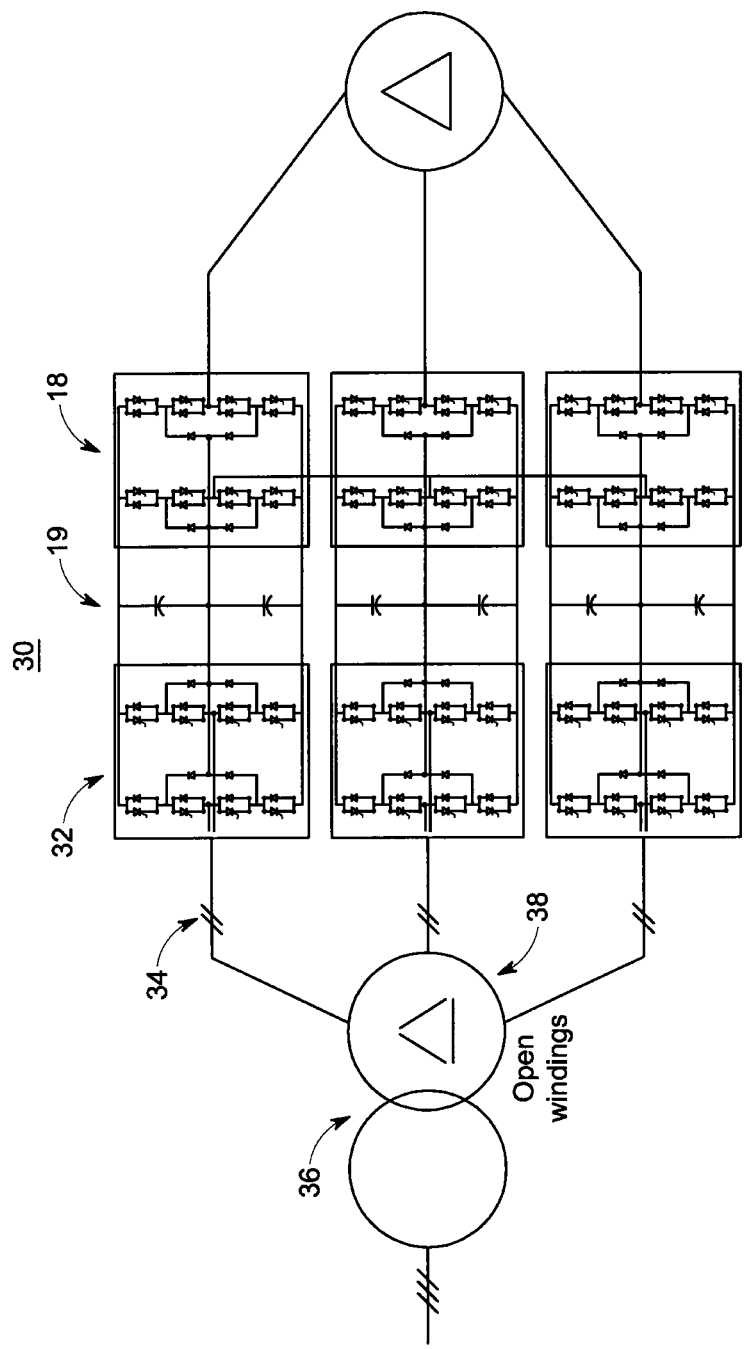
FIG. 2 illustrates a regenerative converter according to one embodiment.

FIG. 2 illustrates a regenerative converter 30 according to one embodiment. The converter 30 topology is advantageous in that it allows use of a regular machine connection. Converter 30 can be seen to employ a plurality of active H-bridge converters 32. Each H-bridge converter 32 is coupled to a corresponding H-bridge inverter 18 via a corresponding dc-link 19. The converter 30 H-bridge converters 32 are each also coupled to a corresponding pair of open secondary winding connections 34 of a three-phase transformer 36 with open (isolated) secondary windings 38. The converter 30 advantageously requires fewer active components in the active front end as well as fewer connections connecting the grid transformer 36 to the active front end of the converter 30.

Depending on the design of the transformer 36, a certain degree of freedom arises for the grid side H-bridge control. Specifically, when the primary side of the transformer 36 is delta connected, a common mode current can be injected in the H-bridge phase currents without affecting the grid. When the primary of the transformer is star connected, a common mode voltage can be injected in the H-bridge phase voltages without affecting the grid. Both degrees of freedom can be utilized to control the power balance between the phases, e.g. for reducing the dc-link voltage ripple or for removing long term drifts.

Figure 3:
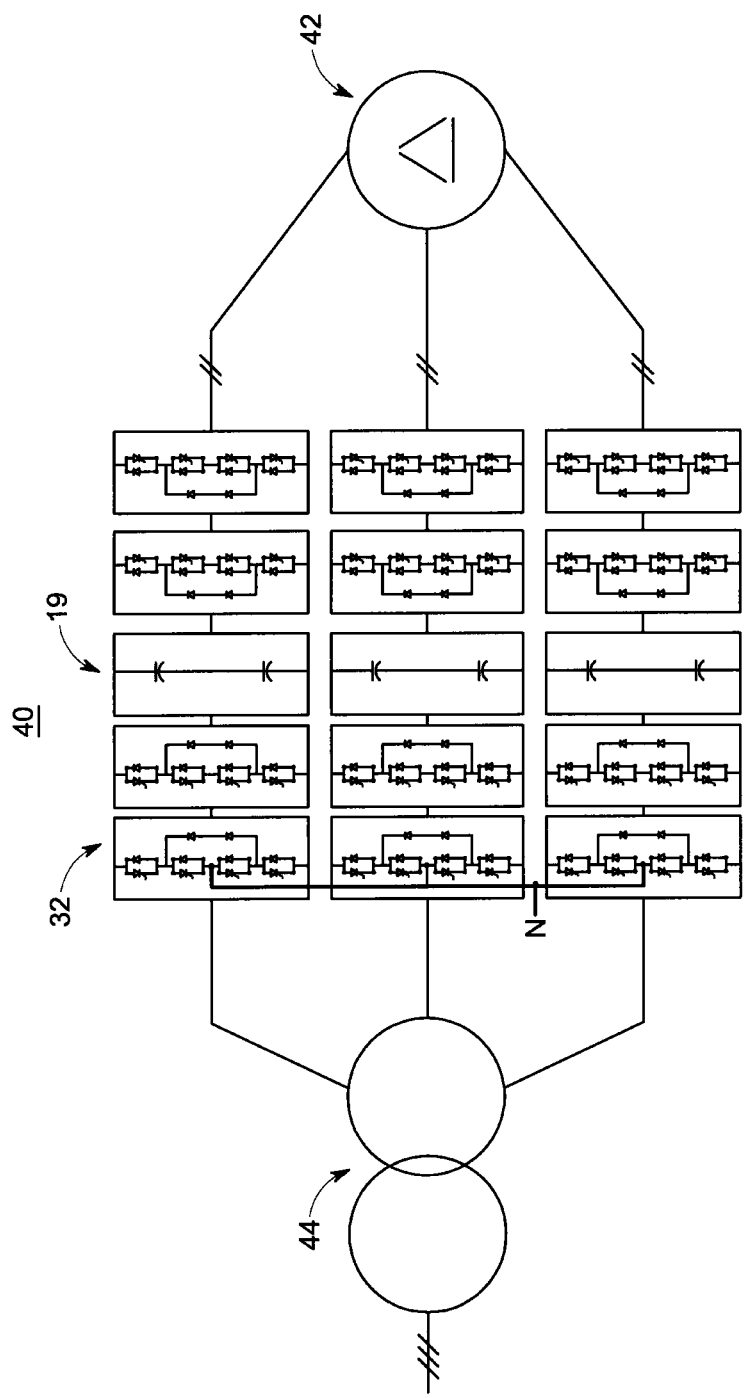
FIG. 3 illustrates a regenerative converter according to another embodiment.

FIG. 3 illustrates a regenerative converter 40 according to another embodiment. The converter 40 topology is similar to the converter 30 topology, except the converter 40 employs a machine 42 with open windings on the machine side of the converter 40. Machine 42 provides the required isolation between the dc-links 19 to avoid a short circuit condition that would otherwise be caused by connecting a conventional three-phase transformer 44 to the H-bridge converters 32. The H-bridge converters 32 are configured to provide the input conversion stage for the active front end of the regenerative converter 40.

Figure 4:
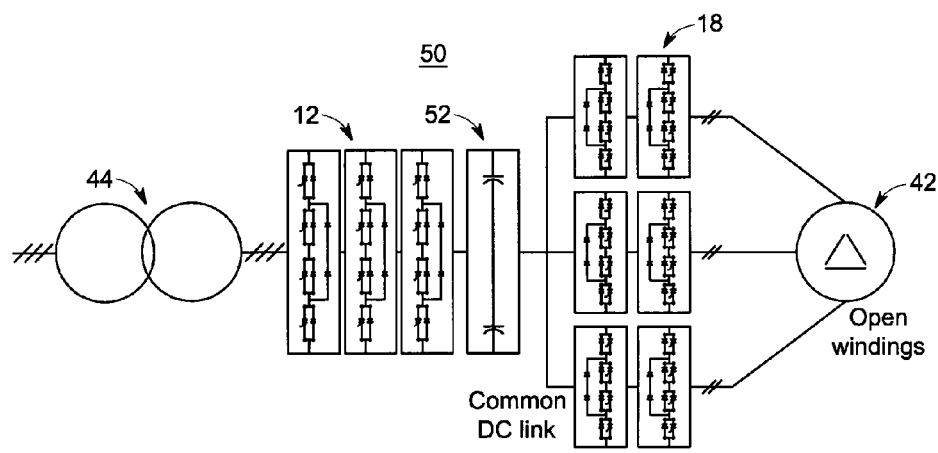
FIG. 4 illustrates a regenerative converter according to one embodiment.

FIG. 4 illustrates a regenerative converter 50 according to one embodiment. The converter 50 comprises a three-phase input conversion stage 12 that is coupled at its input to three phases of a conventional three-phase transformer 44 secondary winding, and at its output to a common dc-link 52. The common dc-link 52 couples the three-phase input conversion stage 12 to three H-bridge inverters 18 that are connected at their outputs to a three-phase machine with open windings 42 on the machine side of the converter 50.

Figure 5:
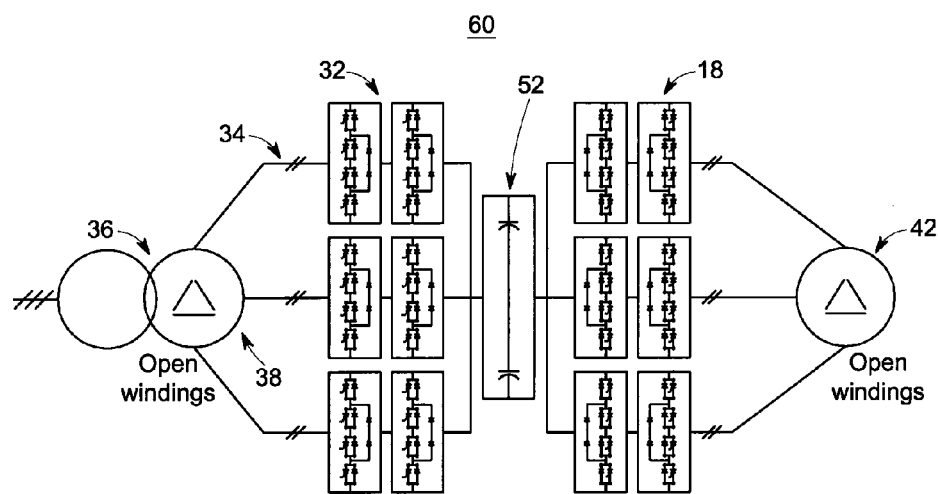
FIG. 5 illustrates a regenerative converter according to another embodiment.

FIG. 5 illustrates a regenerative converter 60 according to another embodiment. The converter 60 includes an active front end (AFE) comprising three H-bridge converters 32 that is coupled at its input to six phase terminals 34 of a three-phase transformer 36 with open secondary windings 38, and at its output to a common dc-link 52. The common dc-link 52 couples the three H-bridge converters 32 to an H-bridge inverter stage comprising three H-bridge inverters 18 that are connected at their outputs to a three-phase machine with open windings 42 on the machine side of the converter 60.

Figure 6:
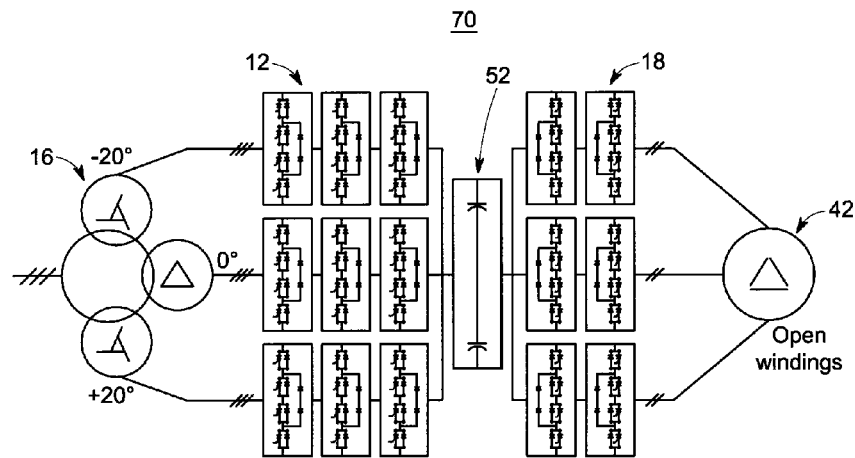
FIG. 6 illustrates a regenerative converter according to yet another embodiment.

FIG. 6 illustrates a regenerative converter 70 according to yet another embodiment. The converter 70 includes an active front end comprising a plurality of three-phase input conversion stages 12. Each input conversion stage 12 is coupled at its input/grid side to three secondary winding phases of a corresponding conventional three-phase transformer 16, and at its output to a common dc-link 52. The common dc-link 52 couples the plurality of three-level input conversion stages 12 to a plurality of H-bridge inverters 18 that are connected at their outputs to a three-phase machine with open windings 42 on the output/machine side of the converter 70.

Figure 7:
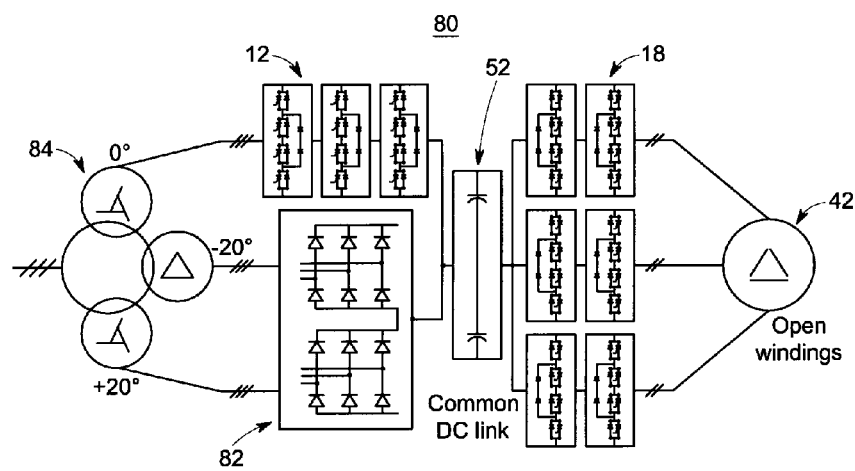
FIG. 7 illustrates a partially regenerative converter according to still another embodiment.

FIG. 7 illustrates a partially regenerative converter 80 according to still another embodiment. The converter 80 includes an active front end comprising a three-phase input conversion section 12 and a pair of diode rectifier converter sections 82. Each section 12, 82 of the active front end is coupled at its input/grid side to three secondary winding phases of a corresponding conventional three-phase transformer 84, and at its output to a common dc-link 52. The common dc-link 52 couples each section of the active front end to a plurality of H-bridge inverters 18 that are connected at their outputs to a three-phase machine with open windings 42 on the output/machine side of the converter 80.

In summary explanation, various converter topologies have been described. A preferred embodiment comprises a three phases to three-phase, active front end converter topology based on three-level neutral point clamped H-bridges, and an inversion stage for each of the three phases. According to one embodiment, the output voltage is synthesized using a plurality, e.g. five, independent voltage levels in order to generate the desired sinusoidal waveform. The desired voltage levels can be generated by a local controller for each H-bridge inverter or set of H-bridge inverters, such as depicted in FIG. 2. The local controllers can be themselves controlled from a central controller, such as also depicted in FIG. 2. Each dc link of the phase bridges are isolated between each other, as stated herein. According to one aspect, a transformer with open (isolated) secondary windings may be used at the input which provides a simpler topology than other known regenerative converter topologies using H-bridges. A regenerative converter topology using the principles described herein provides four quadrant operations for the output voltages and currents, and advantageously employs up to or less than two-thirds the number of active front end components than the closest know topology of its kind. Further, some embodiments of active power flow control across each of the isolated dc links can reduce the required number of dc link capacitors.

While only certain features of the invention have been illustrated and described herein, many modifications and changes will occur to those skilled in the art. Those skilled in the power converter art for example, will readily appreciate the various transformer primary winding and secondary winding configurations illustrated herein are merely exemplary, and other numbers and configurations of secondary windings are possible. It is, therefore, to be understood that the appended claims are intended to cover all such modifications and changes as fall within the true spirit of the invention.

The drawings, for example, illustrate a 3-Level Neutral Point Clamped (NPC) topology utilized in three-phase bridges and the H-bridges. However, the principles described herein can also be applied using 2-level phase legs or another multi-level topology to build the three-phase bridges or the H-bridges. Further, although the drawings show only a single H-bridge per phase on each side, the principles described herein can also be applied for multiple H-bridges per side and phase. Although topologies are shown for three-phase systems, they can easily be applied for other multi-phase systems. Embodiments that show a standard transformer on the grid-side can also work without transformer when the grid voltage is matching the converter voltage rating.

The invention claimed is:

1. A power converter comprising: a multi-phase transformer; a multi-phase input conversion section comprising an active front end (AFE) coupled to the multi-phase transformer, wherein the AFE comprises at least one multi-phase input converter stage and at least one multi-phase diode rectifier converter stages, an input converter stage and a multi-phase diode rectifier converter each having an input side that is coupled to each phase of the multi-phase transformer at a secondary winding for the multi-phase transformer; a second multi-phase output section comprising a plurality of H-bridge inverters, wherein the plurality of H-bridge inverters is coupled via a dc link stage to the AFE; and a multi-phase machine comprising isolated open windings that are connected to only the H-bridge inverters to provide a regenerative power converter.

2. The power converter according to claim 1, wherein the multi-phase transformer has open secondary windings.

3. The power converter according to claim 1, wherein the AFE comprises a plurality of H-bridge converters.

4. The power converter according to claim 1, wherein the dc link stage comprises a plurality of dc link capacitor sections, each dc link capacitor section isolated from every other dc link capacitor section.

5. The power converter according to claim 1, wherein the dc link stage consists of a single dc link capacitor section common to both the AFE and the plurality of H-bridge inverters.

6. The power converter according to claim 1, wherein the AFE consists of a single multi-phase, input conversion stage.

7. The power converter according to claim 1, wherein the AFE comprises a plurality of multi-phase input conversion stages.

8. The power converter according to claim 1, wherein the AFE comprises a plurality of multi-phase, input converter stages and a plurality of multi-phase, diode rectifier converter stages.

9. The power converter according to claim 1, wherein the multi-phase transformer second multi open windings are connected to only the AFE when the multi-phase machine open windings are connected to the H-bridge inverters, and further wherein the multi-phase transformer second multiphase EMECD open windings are connected to only the H-bridge inverters when the multi-phase machine first multiphase EMECD open windings are connected to the AFE to provide the regenerative power converter.

10. The power converter according to claim 3, wherein at least one of the plurality of H-bridge converters comprises a three-level neutral point clamped H-bridge.

11. The power converter according to claim 9, wherein the dc link stage consists of a single dc link capacitor section common to both the AFE and the plurality of H-bridge inverters.

12. The power converter according to claim 9, wherein the multi-phase machine is a transformer with open secondary windings.

13. The power converter according to claim 9, wherein the AFE comprises a plurality of H-bridge converters.

14. The power converter according to claim 13, wherein at least one H-bridge converter comprises a three-level neutral point clamped H-bridge.

15. A power converter comprising:
a multi-phase transformer;
a first multi-phase input conversion section comprising at least one H-bridge converter and at least one multi-phase diode rectifier converter, the H-bridge converter and the multi-phase diode rectifier converter each having an input side that is coupled to each phase of the multi-phase transformer at a secondary winding for the multi-phase transformer;
a second multi-phase output section comprising a plurality of H-bridge inverters, wherein each H-bridge inverter is coupled by a corresponding dc link stage to a corresponding H-bridge converter such that each dc link stage is isolated from every other dc link stage; and
a multi-phase machine comprising open windings that are connected to only the plurality of H-bridge inverters to provide a regenerative power converter.

16. The power converter according to claim 15, wherein the multi-phase machine EMECD is a transformer with open secondary windings that are connected to only the plurality of H-bridge converters.

17. The power converter according to claim 15, wherein the multi-phase machine has open windings that are connected to only the plurality of H-bridge inverters.

18. The power converter according to claim 15, wherein at least one H-bridge converter comprises a three-level neutral point clamped H-bridge.

19. The power converter according to claim 15, wherein a degree of freedom in the common mode voltages or currents within the multi-phase machine EMECD is utilized to control power flow between dc-links.

20. A power converter comprising: a multi-phase transformer; a first multi-phase input conversion section comprising at least one H-bridge converter and at least one multi-phase diode rectifier converter, the H-bridge converter and the multi-phase diode rectifier converter each having an input side that is coupled to each phase of the multi-phase transformer at a secondary winding for the multi-phase transformer; a second multi-phase output section comprising a plurality of H-bridge inverters coupled to the first section by a single common dc link; and a multi-phase electro-magnetic energy conversion device (EMECD) comprising isolated phase windings that are connected to only the plurality of H-bridge inverters to provide a regenerative power converter, wherein each EMECD isolated phase winding is isolated from each other EMECD isolated phase winding.

21. A power converter comprising: a multi-phase transformer; a first multi-phase input conversion section comprising at least one a plurality of H-bridge converter converters and at least one multi-phase diode rectifier converter, the H-bridge converter and the multi-phase diode rectifier converter each having an input side that is coupled to each phase of the multi-phase transformer at a secondary winding for the multi-phase transformer; a second multi-phase output section comprising a plurality of H-bridge inverters, wherein the first multi-phase input conversion section is coupled by a single common dc link stage to the second multiphase output section; wherein the multi-phase transformer comprising comprises isolated phase windings that are connected to only the plurality of H-bridge converters, wherein each of the multi-phase transformer first isolated phase winding is isolated from each other of the multi-phase transformer first EMECD isolated phase winding; and a multi-phase EMECD comprising isolated phase windings that are connected to only the H-bridge inverters to provide a regenerative power converter, wherein each second EMECD isolated phase winding is isolated from each other second EMECD isolated phase winding.

* * * * *